(12) United States Patent
Agnihotri et al.

(10) Patent No.: US 10,864,481 B1
(45) Date of Patent: Dec. 15, 2020

(54) ENERGY EFFICIENT LOW-FOULING HIGH-RECOVERY REVERSE OSMOSIS SYSTEM FOR BRACKISH WATER DESALINATION

(71) Applicants: Dileep Kumar Agnihotri, Austin, TX (US); John Joseph Barelli, Rockford, IL (US)

(72) Inventors: Dileep Kumar Agnihotri, Austin, TX (US); John Joseph Barelli, Rockford, IL (US)

( * ) Notice: Subject to any disclaimer, the term of this patent is extended or adjusted under 35 U.S.C. 154(b) by 3 days.

(21) Appl. No.: 16/105,103

(22) Filed: Aug. 20, 2018

(51) Int. Cl.
    C02F 1/44      (2006.01)
    C02F 1/66      (2006.01)
    B01D 61/02     (2006.01)
    B01D 61/08     (2006.01)
    B01D 61/12     (2006.01)
    B01D 65/08     (2006.01)
    C02F 103/08    (2006.01)

(52) U.S. Cl.
    CPC ......... B01D 61/022 (2013.01); B01D 61/025 (2013.01); B01D 61/08 (2013.01); B01D 61/12 (2013.01); B01D 65/08 (2013.01); C02F 1/441 (2013.01); C02F 1/66 (2013.01); B01D 2311/18 (2013.01); B01D 2313/18 (2013.01); B01D 2317/022 (2013.01); B01D 2321/02 (2013.01); C02F 2103/08 (2013.01); C02F 2201/005 (2013.01); C02F 2209/005 (2013.01); C02F 2209/03 (2013.01); C02F 2303/20 (2013.01); C02F 2303/22 (2013.01)

(58) Field of Classification Search
    None
    See application file for complete search history.

(56) References Cited

U.S. PATENT DOCUMENTS

| | | | | |
|---|---|---|---|---|
| 4,312,755 A * | 1/1982 | Hwang | ............... | B01D 61/022 210/321.87 |
| 4,980,066 A * | 12/1990 | Slegers | ............... | B01D 61/022 210/636 |
| 4,986,918 A * | 1/1991 | Breslau | ............... | B01D 61/145 210/652 |
| 6,099,733 A * | 8/2000 | Haney | ................. | B01D 61/025 210/100 |
| 6,113,797 A * | 9/2000 | Al-Samadi | .......... | B01D 61/022 210/650 |
| 9,206,060 B1 * | 12/2015 | Abusharkh | ........... | B01D 61/10 |

(Continued)

Primary Examiner — Krishnan S Menon

(57) ABSTRACT

A novel multi-stage reverse osmosis system is proposed that allows for following benefits —a) reduction in pressure-loss while achieving optimum cross-flow velocities and therefore reducing energy consumption of 4-10%; —b) increased flux balance between stages resulting in reduced fouling of the first stage; —c) disruption of scale forming conditions resulting in reduced scaling of the last stage; —d) reduction in scale potential of the concentrate valve; —e) reduction in downtime for CIP by proactively disrupting scaling or fouling through several innovative methods; —f) ease-of and effectiveness-of CIP with reduced number of valves and —g) to keep system operational via isolation of the last stage for maintenance while the keeping remaining system in production mode. All the above improvements are achieved with process-flow and operational characteristics defined in the Specifications and Claims.

7 Claims, 4 Drawing Sheets

(56) References Cited

U.S. PATENT DOCUMENTS

| | | | | |
|---|---|---|---|---|
| 2003/0141250 A1* | 7/2003 | Kihara | ............... | B01D 61/022 210/652 |
| 2005/0035048 A1* | 2/2005 | Chancellor | .......... | B01D 61/022 210/321.89 |
| 2005/0067341 A1* | 3/2005 | Green | ................ | B01D 61/022 210/321.69 |
| 2007/0246406 A1* | 10/2007 | Dibel | .................. | B01D 61/142 210/96.2 |
| 2008/0105617 A1* | 5/2008 | Oklejas | ............... | B01D 61/022 210/637 |
| 2008/0164206 A1* | 7/2008 | Dueker | ............... | B01D 61/022 210/636 |
| 2009/0211973 A1* | 8/2009 | Gilron | ................. | B01D 61/022 210/636 |
| 2010/0032377 A1* | 2/2010 | Wohlert | .............. | B01D 61/022 210/652 |
| 2011/0309007 A1* | 12/2011 | Ito | ........................ | B01D 61/022 210/195.2 |
| 2014/0021135 A1* | 1/2014 | Sawyer | .................. | C02F 1/445 210/652 |
| 2014/0360941 A1* | 12/2014 | Kitamura | ............ | B01D 61/022 210/652 |
| 2015/0144559 A1* | 5/2015 | Taniguchi | ............ | B01D 65/08 210/650 |

\* cited by examiner

ENERGY EFFICIENT LOW-FOULING HIGH-RECOVERY REVERSE OSMOSIS SYSTEM FOR BRACKISH WATER DESALINATION

PRIORITY CLAIM

None.

STATEMENT OF FEDERALLY FUNDED RESEARCH

None.

CROSS-REFERENCE TO RELATED APPLICATIONS

None

TECHNICAL FIELD OF THE INVENTION

The present invention relates in general to the field of desalination and primarily focuses on Brackish water (defined as total dissolved solids, TDS, in range of 100-20,000 mg/L) desalination. The novel concepts disclosed in this Application are specific to Nano Filtration (NF) and Reverse Osmosis (RO) systems and processes utilizing RO and NF membranes in a two or more stages in tandem. This invention focuses around a novel desalination method to—1) reducing fouling and fouling-potential; 2) reducing energy consumption; and 3) improving cleanability while simultaneously lowering equipment cost and simplifying the clean-in-place (CIP) process. The end-result is a novel low-fouling, high-recovery, energy-efficient reverse osmosis system for brackish water desalination.

BACKGROUND OF THE INVENTION

Without limiting the scope of the invention, its background is related to water purification membranes for removal of total dissolved solids (TDS) using NF/RO membrane technology. The primary treatment of water purification may involve biological or chemical methods such as bio-reactors or clarifiers with coagulation/flocculation processes followed by removal of suspended solids using porous media such as bag-filters, cartridge-filters, multimedia, sand-filters, and micro- or ultra-filtration membranes. The primary treatment processes are not able to remove dissolved solids and impurities and only focus on organics and suspended solids. Additional, secondary treatment process such as cold-lime softening, NF or RO methods are implemented for removal of dissolved solids (desalination) such as sodium, chlorides, sulphates, carbonates, silicates, calcium, and magnesium.

Membranes have proven to be very efficient and energy friendly for desalination applications. They are engineered and highly optimized to remove specific material from the influent, for example, total dissolved solids (TDS) in form of mono and di- and tri-valent ions such as $Na^+$, $Cl^-$, $Mg^{2+}$, $Ca^{2+}$, $SO_4^{2-}$, $Al^{3+}$, $N^{3-}$, and other high molecular weight materials such as sugars, chemicals, organic molecules and other macromolecules. A RO membrane is optimized to reject smallest of the ions such as Na+Cl– ions while an NF membrane is optimized to reject slightly larger and more charged Ca++ and Mg++ ions and are employed to remove dissolved salts.

The RO or NF membranes have a polymer matrix with a charged and dense barrier layer (generally polyamide film) where most separation occurs, and the barrier layer allows mostly water to pass through while rejecting the passage of solutes such as salt ions. These membranes can treat water with varying salt concentrations (10 to 40,000 parts per million [ppm]) and can remove 98-99.8% (50-90% in case of NF membranes) of the salts from the feed stream. The process requires that a high pressure be exerted on the feed side of the membrane, usually 50-300 psi for brackish water (100-10000 ppm TDS), 300-600 psi for high TDS (10000-25,000 ppm TDS) brackish water and 600-1,000 psi for seawater (30,000-40,000 ppm TDS), to overcome the osmotic pressure corresponding to the salt concentration.

During the filtration, the NF/RO membranes allow water to permeate while rejecting dissolved solids, resulting in an increase in concentration of dissolved ions and formation of a concentration polarization (CP) layer near membrane surface. As concentration polarization develops near membrane surface, the concentration of foulants, scaling ions such as sulphates, carbonates, silicates, colloidal silica, and biological elements such as bacteria, bio-film, food for bacteria (nitrates), etc. amplifies and often accelerates scaling and fouling of the membrane surface. In addition, CP layer increases the osmotic pressure resulting in need for higher net driving force for same permeability. As a result, membranes require periodic cleaning and maintenance. Overtime, irreversible fouling occurs affecting membrane performance, % recovery, energy consumption, duration of CIP, frequency of CIP, and ease-of-CIP directly impacting the overall efficiency and operational costs.

The increased concentration of CP layer and foulants on membrane surface, particularly in the areas of low-mixing and where high concentration causes precipitation of ions and creates a favorable condition for seed sites accelerating scaling and biofouling. To mitigate the issue of cake formation or concentration polarization layer formation near membrane surface, several strategies are used in current state of art NF/RO systems. These strategies include—

1. Membrane spacers with unique shapes and sizes to promote mixing along the length of the membrane module. A PhD thesis by Shenwei [001] attempts to model how various spacer design and cross-flow velocities provide mixing, its impact on the CP layer and reflect on areas where dead zones form. As shown in Shewei's thesis, the immediate areas near the spacer joints have minimum flow velocities and maximum salt concentrations. These become ideal sites for initial crystallization or bio-fouling seeds. Over time, the seeds grow larger and outward from joint areas and begin to impact the open membrane spaces where the mixing and cross-flow velocities are sufficient to move away suspended solids or precipitants; however, once the seeds of scale or bio-foulants are established, they grow rapidly even in turbulent zones to foul and scale most of membrane surface.
2. Higher cross-flow fluid velocities near the membrane surface, which comes at the cost of increased friction losses resulting in higher energy consumption. Some membrane manufacturer offers membranes with higher friction loss, but with improved mixing of CP with specific spacer design to reduce fouling. Geraldes et. al [002] showed hydrodynamics and concentration polarization in NF/RO spiral-wound modules with ladder type spacers.
3. Membrane surface modifications to make it more hydrophilic, less-charged, and smoother to reduce adhesion of foulants causing delayed formation of seed sites. Many membrane manufactures apply post production surface modification on Polyamide layer to make it more hydrophilic, however, there commercial membranes reach somewhere between 50 and 60 degree of water droplet contact angle at best. Recently, polydopamine based coatings by Freeman et. al [003] from UT-Texas have shown significant improvement in hydrophilicity and surface charge along with water droplet contact angles in range of 25-35 degrees on NF/RO membranes, thus significant reduction of adhesion of foulants to the membrane surface and respond favorably to cleaning processes.

4. Design and operation of NF/RO membranes systems that operate with limits of critical flux for a given type of water. A critical flux is defined as production rate per unit area of membrane where flux remains stable over prolonged periods and suffers little to no loss when pressure and mass flow conditions are held steady.

Beside the strategies described above, use of anti-scalants is a frequent practice in inhibiting scaling. Anti-scalants are formulations of chemicals that delay precipitation or extend the solubility limits of scale-producing ion-species such as $CaCO_3$, $CaSO_4$, $CaPO_4$, $BaSO_4$, $MgSO_4$ and may sequester oxidizing metal species such as Fe, Mn and Al. These are injected in feed streams of NF/RO system and increase the recovery limits to higher levels; however, they do not eliminate scaling behavior, only delay the onset or increase the recovery limits. Use of biocide is also a widespread practice to prevent bio-fouling of the NF/RO membranes. In industrial application, there is less resistance to use of biocides, however, in case of drinking water application, the use of biocides is very sparse.

During fouling process, there is an order of magnitude longer period during which seeds sites are formed, compared to the period during which the seed sites grow into a conformal foulant/scalant film, resulting in an exponential loss of membrane performance in the latter period. It is therefore highly desirable to prevent, delay or disrupt the formation of the seed sites. Unfortunately, most of the NF/RO systems today run at a set production-point (production demand) and automatically compensate for loss of flux from fouling and scaling by increasing the operating pressure. Operators do not know how the system is fouling over time, except for observing that there is an increase in operating pressure over time, which could also be due to more than one factor —a) reduction in feed water temperature, b) membrane fouling, c) increase in salinity. And, once pump reaches its pressure limits, the system is no-longer able to produce the requested demand of product. At this point, operator has no option but to subject the entire system to a CIP process, which could take anywhere from 8-12 hours in duration and may require cleaning steps with a low-pH or high-pH or a combination thereof. Among the three causes for increase in operating pressure, the changes in temperature and salinity can be seen through probes, however, fouling information is not trivial to monitor. Only a temperature and salinity normalized data can show if membranes are suffering from fouling (or scaling). In most practical implementations, NF/RO system would usually foul or scale and reach a point of non-operable condition without options for pre-emptive interventions. And finally, an offline CIP must be performed, while the system is taken out of service. The CIP cycles are repeated, and membrane rejection performance degrades with repeated CIP and eventually require replacement.

In an ideal scenario, if the NF/RO system can delay the onset of seed-sites formation, along with a disruption in the process of seed growth coupled with removal of seed-sites if formed during operation predominantly eliminating the situation where fouling and scaling seeds have formed, and their rapid growth is imminent resulting in conformal scaling or bio-fouling with loss of flux or increase in pressure, pushing the system to no-point-of-return without the CIP. In this inventive desalination process, Applicant teaches inventive steps to achieve ideal scenario described herewith and at the same time addressing the energy loss and critical flux issues outlined above in paragraph 9.

During the CIP process, an ineffective cleaning is a commonly encountered challenge, particularly, if cleaning chemistry concentration, pH, temperature or the duration of CIP is not sufficient. Additionally, in case of an ineffective cleaning, areas of fouling/scaling may remain after the CIP and become seed-sites for subsequent fouling/scaling cycles, which are accelerated from presence of seed-sites and results in a shorter operation period with an increase energy demand for the membrane system in between subsequent CIP cycles. This challenge could be minimized with the inventive steps taught in this Application.

During last 2-3 decades, brackish water desalination has been adopted widely with a focus on maximizing the production per unit membrane area and minimizing the energy usage per unit product. Use of energy recovery methods is widely used in seawater industry, however, since the brackish water desalination systems operate at high recoveries (75-90%) and low-pressures (100-300 psi), there is not much opportunity for implementation of energy recovery from the pressurized concentrate because the volume is not significant, and the pressure of the concentrate stream is low (50-250 psi). This renders usage of energy recovery turbines or exchanger inefficient and expensive. To achieve the goal of maximum recovery with minimum energy, multi-stage NF/RO systems have evolved, where one high-pressure pump usually feeds several pressure vessels coupled in a series (or stages) with several membranes in each pressure vessel. The number of pressure vessels (PV) in each stage gradually decrease to compensate for reduction in feed-flow (as part of the feed flow is filtered and removed through permeate production) to maintain flow-velocity inside pressure-vessels within an optimum range. A 3-staged RO configuration is generally written as A-B-C:xM, where A, B, and C correspond the number of PV in first, second, and third stages and xM corresponds to number of membranes in each PV. There is no fixed rule for such design, however, vendors will generally design staging ratios along the lines of 3-2-1 (3-stage 3-6M) or 4-2 (2-stage with 3-6M) and even 2-1-1 or 3-2-1-1 are seen in marketplace. To come up with an optimum configuration, membrane vendors provide simulation software such as ROSA (from Dow Chemicals), WINFLOWS (from GE/SUEZ), IMSDesign (from Hydranautics) and a user enters the membrane types, water chemistry, temperature, pH of the stream to be treated and comes up with an optimum design for stage configuration. An example of such a simulation from software Winflows for flow-rates in gallons per minute (gpm), flux in gallons per square feet per day (gfd), feed pressures and pressure losses in psi (delta P, DP), and feed and permeate quality in mg/L as TDS and is shown here in the Table 1 below—

| WinFlows Results Summary | | | | | | |
|---|---|---|---|---|---|---|
| Raw Feed (gpm) | | 240.00 | Raw Feed TDS (mg/L) | | 725.96 | |
| Product (gpm) | | 199.95 | Product TDS (mg/L) | | 8.31 | |
| Concentrate (gpm) | | 40.05 | Concentrate TDS (mg/L) | | 4281.41 | |
| Temperature (Centigrade) | | 13.0 | System Recovery | | 83.3% | |
| Average System Flux (gfd) | | | | | 13.33 | |
| Stage 1 Flux (gfd) | | | | | 15.03 | |
| Stage 2 Flux (gfd) | | | | | 12.81 | |
| Stage 3 Flux (gfd) | | | | | 10.71 | |
| Stage (#) | Housing (#) | Elements (#) | Element Type (400 ft) | Feed Flow (gpm) | Permeate Flow (gpm) | Feed Pressure (psi) | Delta Pressure (psi) | Permeate TDS (mg/L) |
| 1 | 4 | 24 | AG8040F | 240.0 | 100.2 | 186.6 | 25.1 | 4.2 |
| 2 | 3 | 18 | AG8040F | 139.8 | 64.1 | 161.5 | 16.2 | 8.6 |
| 3 | 2 | 12 | AG8040F | 75.7 | 35.7 | 145.3 | 11.5 | 19.7 |

The above example is illustrated for a 4-3-2 design with 6 membrane elements in each PV with a total of 54 membrane elements (400 ft$^2$, each). As one can see from the table the feed pressure for each stage will decrease (due to pressure loss inside membrane elements due to friction and permeate volume loss) while the TDS of feed to each stage increases in proportion to the flux recovery ratio. As discussed in the following paragraphs, the multi-stage design has several serious shortcomings that encourages fouling and scaling of the system. The shortcomings discussed below are addressed with the proposed novel desalination system—

1. In the above example, permeate recoveries (ratio of permeate to feed) for stages 1, 2, and 3 are very similar (42-46%), however, the average flux (in gfd) for the three stages are significantly different 15.0-10.7, a substantial change (>25%). If one further investigates the flux of each element, the differences can be large (>50%) between the lead element in the first stage to the tail element in the third stage. To achieve a required production from the entire system, while utilizing the initial feed pressure from single pump, one encounters highest production from the lead elements in the first stage due to highest pressure and lowest salinity concentration resulting in operation of the first stage at significantly higher flux. Any particulates or organics that are not able to pass through the membrane has higher probability of fouling the first stage membranes, while the third stage and its tail elements encounter least pressure and highest salinity concentration resulting in significantly lower flux. This over-flux (first stage) and under-flux (third stage) is not desirable and a leading cause of bio-fouling and particulate fouling of first stage.
2. In the above example, the feed stream ions go through incremental concentration (as more than 99% of them are rejected by the membrane and remain in feed for the subsequent stage), and by the time they reach last element of the last stage, the ion-concentrations increase by about 4-6 folds, creating a condition for precipitation of various ion-pair species as discussed in paragraph 10. Although, depending on the solubility index of an ion-pair species, water chemistry, temperature, pH and availability of counter-ion, some may precipitate quickly, while others may take some time to precipitate. Furthermore, depending on flow-velocities and surface interactions, some may form scale-seeds, while others may simply exit the system. Unfortunately, since the concentration of scale forming species in last stage reaches a maximum concentration-state, it's not a question of if, but its question of when the precipitation will occur, and membranes will begin to scale.
3. Today's systems also use a "concentrate control-valve" for managing the % recovery while making a demand for a set permeate production rate. These valves are generally manual, static and are initially set to a position and left there for long-periods. In addition, as shown in FIG. 1, a by-pass valve is also used to allow for higher flow-rates in parallel to the "concentrate control-valve" for use during CIP, permeate flush or feed flush of the system and the concentrate control-valves are rarely changed after they are set. With higher scaling tendencies of the feed water near the end of the RO system, the scaling may begin on the "concentrate control-valve" and propagates backward to the last element and then further to the front of the system.
4. As shown in the Table 1, there is a significant pressure loss in the first stage followed by somewhat reduced pressure loss in the second stage and least pressure loss in the third stage. The pressure-loss through first stages is the primary factor behind drastic differences of flux between the stages. As feed streams increase in ion-concentrations, the osmotic pressure required to achieve same flux increase as well. Therefore, pressure loss in the first stage is working against the production in the second and third stage and a pressure loss in the second stage is working against production in the third stage. Ideally, it is important to reduce the pressure loss in the first stage for better balance of the flux across multiple stages and reduction of fouling of the first stage.
5. Although the multiple stage design allows for a very interesting benefit for flow-velocity optimization, however, it is not as flexible to accommodate for feed water changes. As permeate production occurs through stages, the reduction in number of PV for subsequent stages allow for maintaining of the cross-flow velocity in certain range without requiring any special efforts. A too low cross-flow velocity produces poor mixing, thus stronger CP layer and more contact time between contaminant and membrane surface resulting in increased potential for scaling and fouling. Similarly, too high of cross-flow velocity increases potential for excessive pressure loss and abrasion damage but helps reduce the fouling/scaling from reduced contact time. As one deduces the first stage is predominantly susceptible to organics and particulate fouling due to over-flux operations, while the last stage is predominantly susceptible to scale fouling due to increased ion-concentrations and precipitation. It is therefore desirable to achieve higher cross-velocities in last stage while protecting against causing too high velocities in first stage. Such goals are achieved by reducing number of vessels in subsequent stages with a static design and therefore less flexible to responding to changes in water salinity and temperatures.

There are significant challenges with the cleanability of the multistage RO systems. FIG. 1 shows a process layout for current state-of-art staged RO/NF Brackish water systems utilizing a sequential and staged CIP for maintenance of all stages combined. As it is clear from the drawing, during CIP, the cleaning solution must travel through three stages in sequence to interact with foulants and scalants on the membrane surface. This allows higher reaction rates between cleaner and foulant in leading the stage as compared to the trailing stage, since the concentration of cleaning chemistry drops (consumed) as it moves from lead stage to the tail stage. This results in relatively more effective cleaning of the lead stage and allows more contaminated stream to pass through later stages risking the abrasion damage of later stage membranes from particulates generated during CIP, especially sharp scale particulates. In addition, the flow-rate of the total solution is limited by the maximum flow-rate allowed through the third stage, thus limiting the flow-velocities for the leading stage. In an example, a 3-2-1 8" pressure vessel configuration may limit maximum flow of 75 GPM, allowing only 25 GPM in first stage and 37.5 GPM in second stage and 75 GPM in third stage. Although, this allows some recovery in loss of reaction rates for later stage as more chemistry flows through each membrane, however, it increases the flow-velocity significantly, again helping somewhat with reaction rate in last stage but creates significant risk to membrane surface from abrasion. Process layout shown in FIG. 1 is commonly used since the process is simplistic from operations point of view and reduces the initial cost of equipment due to fewer valves/controls requirements. However, this comes with a trade-off where membrane life and performance are negatively impacted with each cleaning cycle.

Some of the shortcomings identified and discussed above have been addressed in other ways, however, with limitations. For example, the over- and under-fluxing issue has been improved with concentrate recirculation loops, where a portion of final concentrate is fed at the inlet of the feed stage prior to high pressure pump, allowing for the overall increase of TDS of the feed water. This results in operation at higher pressures and helps with over-fluxing of the leading stage, however, it comes at cost of —a) higher energy usage; b) increased salinity of permeate; c) introduction of scaling conditions to the first stage where the scaling species get more resident time inside the system and may even produce scale-seeds in the first stage, which in long runs promotes scaling of entire system. Although the latest generation of antiscalants (AS) have pushed the solubility limits and sequestration capabilities of AS agents, allowing recoveries in 85-90% range, however, there is still a pressing demand to further increase the recoveries and reduce concentrate volume.

References such as Dows Reverse Osmosis Membrane Technical Manual [004] and GE/SUEZ presentation by Erickson et. al. [005] can be further consulted to understand how flux through RO membranes can be calculated and its dependence on the feed water chemistry such as ion-concentration (osmotic pressures), temperature, and pressure losses from velocity and permeation.

SUMMARY OF THE INVENTION

The novel invention taught in this Application addresses all 6 challenges outlined in paragraph 15 and provides for —a) increased flux balance between the stages resulting in reduced fouling of the first stage; —b) disruption of the steady-state scale forming conditions resulting in reduced scaling of the last stage; —c) reduction of pressure-losses through the first stage which allows for operations with more flexibility and optimum cross-flow velocities through multiple stages and simultaneously provides 4-10% of energy savings; d) reduction in scale potential of the concentrate valve; —e) reduction in frequency to take the system offline for CIP by proactively disrupting scaling or fouling through several methods; —f) ease-of and effectiveness-of CIP with reduced number of valves and lastly —g) to keep system operational via isolation of the last stage for maintenance while the remaining system is in production mode. The inventive steps in this Application are further summarized in section "Description of the Invention".

BRIEF DESCRIPTION OF THE DRAWINGS

A more complete and thorough understanding of the present embodiments and advantages thereof may be acquired by referring to the following description taken in conjunction with the accompanying drawings wherein.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of distinct ways to make and use the invention and do not delimit the scope of the invention.

To facilitate the understanding of this invention, several terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not delimit the invention, except as outlined in the claims.

Figure 1:
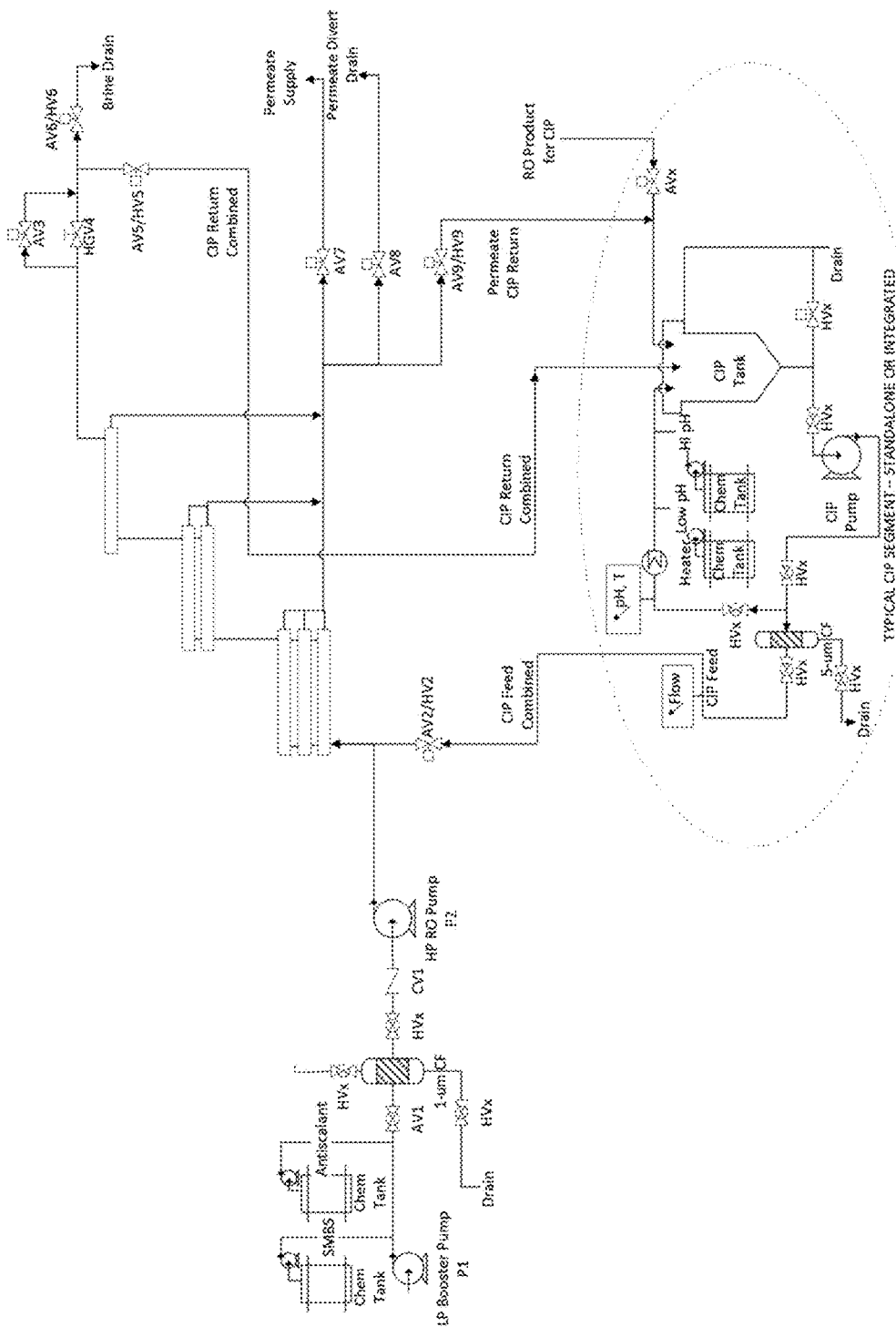
FIG. 1: Process layout for current state-of-art staged RO/NF Brackish water systems utilizing a sequential and staged CIP for cleaning of all stages combined. The system can operate with four (4)-automated valves (AVx), one (1)-adjustable globe valve (AGVx), and four (4) valves that could be automated or hand-operated (AVx/HVx) to support the CIP process. A total of nine (9) valves are required for proper system operation and maintenance, excluding valves that are part of the CIP segment.
Figure 2:
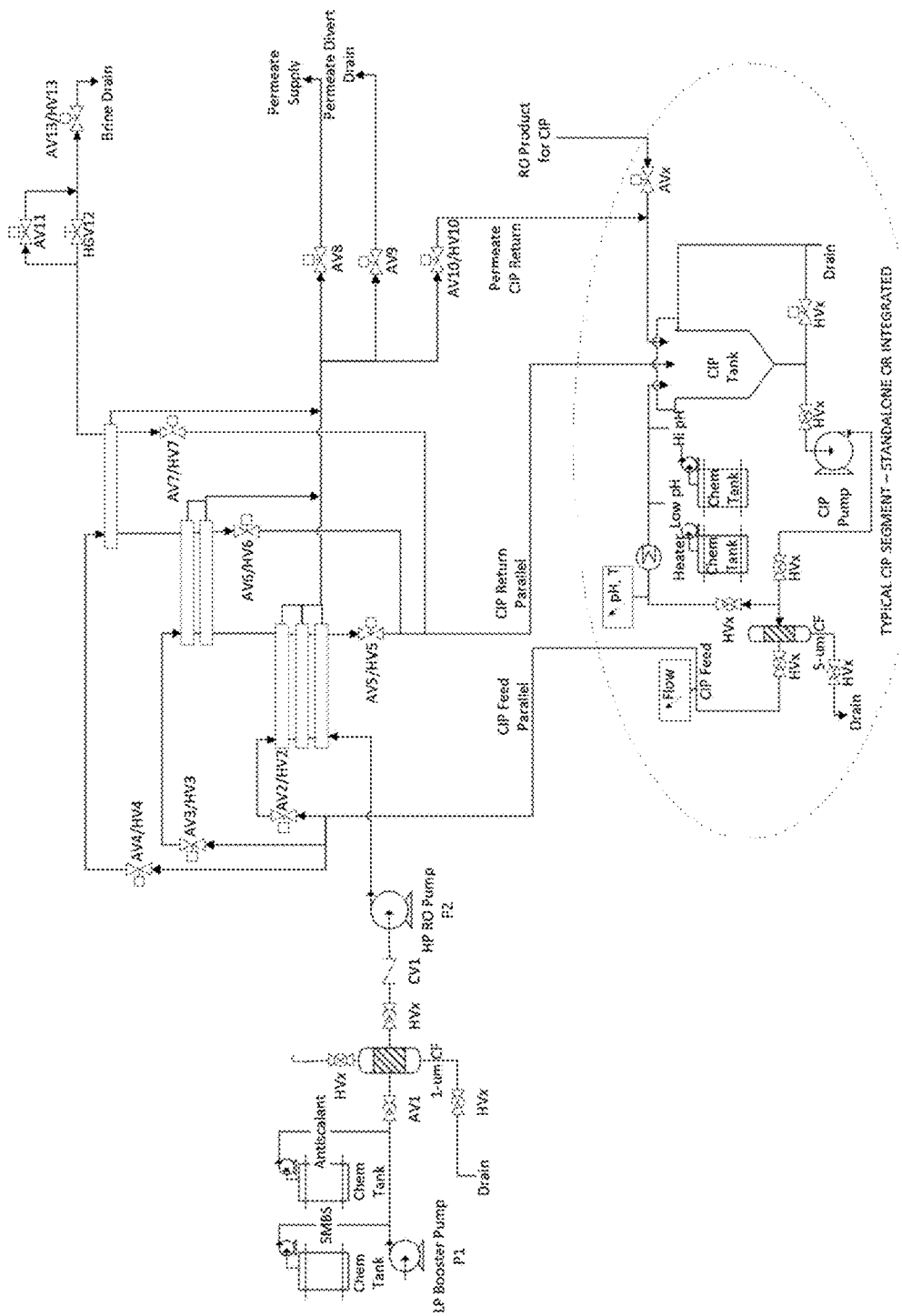
FIG. 2: Process layout for current state-of-art staged RO/NF Brackish water systems utilizing a parallel or an independent CIP for maintenance of each stage. The system can operate with four (4)-automated valves (AVx), one (1)-adjustable globe valve (AGVx), and eight (8) valves that could be automated or hand-operated (AVx/HVx) to support the CIP process. A total of thirteen (13) adjustable valves (identified as valves 1-13) are required for proper system operation and maintenance, excluding valves that are part of the CIP segment.
Figure 3:
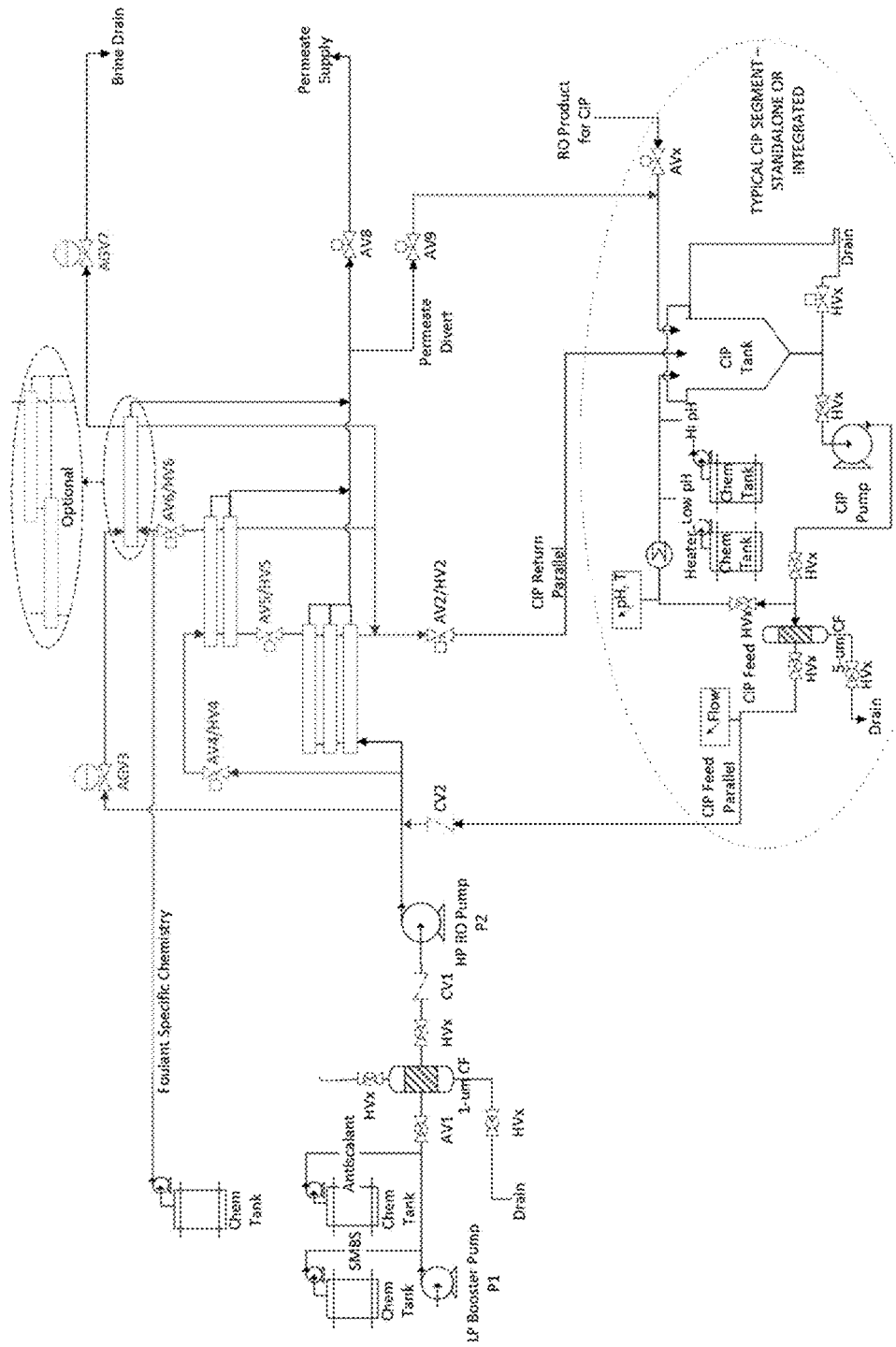
FIG. 3: Process layout for novel (marked as red and dashed lines) staged RO/NF Brackish water systems utilizing a parallel or an independent CIP for maintenance of each stage. The system can operate with three (3)-automated valves (AVx), two (2)-adjustable globe valve (AGVx), one (1) static check-valve, and four (4) valves that could be automated or hand-operated (AVx/HVx) to support the CIP process, either independently for each stage, or in parallel for each stage. A total of nine (9) adjustable valves (identified as valves 1-9) and one (1) static check-valve are required for proper system operation and maintenance, excluding valves that are part of the CIP segment.
Figure 4:
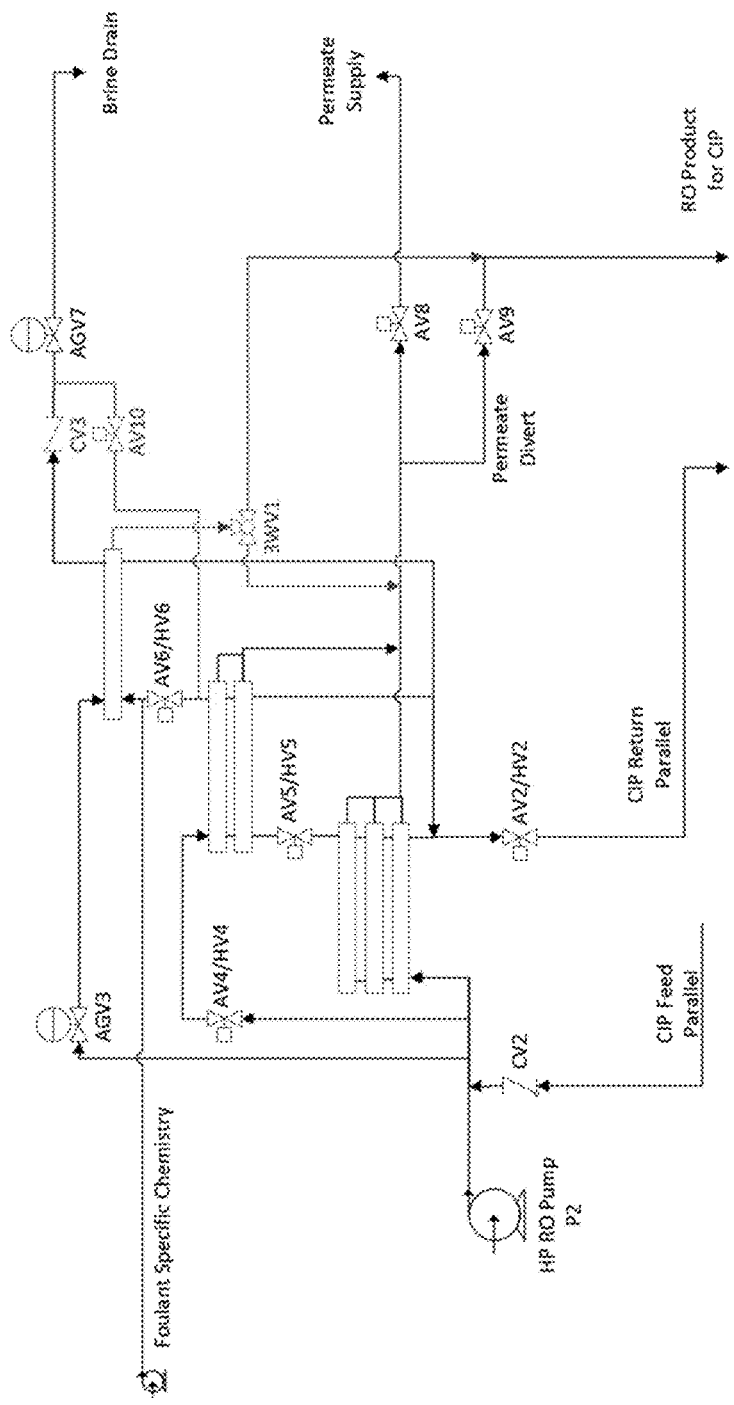
FIG. 4: Portion of the process layout (marked red, in context of FIG. 3) for novel staged RO/NF Brackish water systems depicting partial and full isolation of the third stage during operation while keeping production from the first and second stage going to the Permeate Supply. In partial isolation, the permeate from third stage is sent to the Permeate Divert line and requires an automated 3-way valve addition to the system design. In full isolation, in addition to partial isolation steps, the concentrate from the first and second stage is sent directly to AGV7 bypassing third stage completely through an automated valve AV10 and in conjunction with a check-valve CV3.

With disclosures of the current art, challenges and limitations in Background section including FIGS. 1 and 2, this section further provides descriptive details of the invention summarized earlier and further discussed referencing FIGS. 3 and 4.

In one embodiment of the invention, a portion of the feed volume is sent to the second stage NF or RO directly utilizing a parallel line bypassing the first stage of the RO and shown in FIGS. 3 and 4 as a line with valve AV4/HV4. The amount of bypassed volume is in range of 15-30% of the total feed volume. There is no injection pumps or pressure boosting required since the pressure loss in the first stage is more than the pressure loss in the piping supplying the second stage. This results in following impact —a) reduction in operating pressure to achieve same overall production from the system, —b) increased flux balance between first and last stage since the pressure loss of the volume going to second stage is eliminated, while simultaneously it is boosted in the second stage resulting in higher production in second and third stage. A typical energy saving of >4% are achieved immediately and a flux range is reduced by more >40%. A table below demonstrate, as an example, impact of the invention for a RO with 4-3-2:6M configuration for production of 200 GPM permeate with typical RO membrane. As seen below in the table, current state-of-art 3-stage system produces 200 GPM at 183.1 psi with average flux of 14.8 and 11.4 in first and third stages respectively, while a 20% bypass produces same volume at 172.8 psi with 5.6% energy savings and a flux of 14.2 and 11.8 in first and third stages respectively, leading to shrinking of flux disparity from 3.4 GFD to 2.4 GFD across entire unit. Within the embodiment of this invention, system saves energy and results in reduced fouling of first stage as flux is more evenly distributed.

| Pressure | Energy Sav. | Feed (gpm) | | | Product | Specific Flux (GFD) | | | Flux Range | % Flux |
| --- | --- | --- | --- | --- | --- | --- | --- | --- | --- | --- |
| (psi) | (%) | S1 | S2 | S3 | (gpm) | S1 | S2 | S3 | S1-S3 | Range |
| 183.1 | 0 | 250 | 0 | 0 | 200.0 | 14.8 | 12.7 | 11.4 | 3.4 | 26.0% |
| 172.8 | 5.6% | 200 | 50 | 0 | 200.0 | 14.2 | 13.1 | 11.8 | 2.4 | 18.5% |
| 171.3 | 6.4% | 190 | 60 | 0 | 200.0 | 14.2 | 13.2 | 11.8 | 2.4 | 18.5% |
| 169.9 | 7.2% | 180 | 70 | 0 | 200.0 | 14.1 | 13.2 | 11.9 | 2.2 | 16.9% |

In one embodiment of the invention, the invention of paragraph 27 is achieved via implementation of AV4/HV4 with an automated-valve (AV) or hand-valve (HV) or an automated-globe-valve (AGV4) along with an appropriately sized line or a combination of line-size and valve is used to achieve 15-30% of total feed volume bypass capability required for the invention.

In one embodiment of the invention, the range of the flux across multiple stages of the RO is significantly reduced when used in conjunction with the low-energy (LE) or ultra-low-energy (ULE) membranes as compared to the standard membranes. This is because the ratio of pressure drops across three stages of RO to the operating pressure of the RO is significantly higher due to higher permeating membranes.

In one embodiment of the invention, the range of the flux across multiple stages of the RO is significantly reduced when used in conjunction with the RO membranes with hydrophilic coating which allows them to be resistant to fouling and scaling, thus operations at higher flux is achievable, however, the flux range becomes a bottle-neck to take the benefits of higher flux. With narrowing of the flux range across three stages, the benefits of hydrophilic coating [3] is more accessible with the proposed invention.

In one embodiment of the invention, a portion of the feed volume is sent to the third stage RO intermittently utilizing a parallel line bypassing the first and second stage of the RO and shown in FIGS. 3 and 4 as a line with valve AGV3. The AGV3 is opened intermittently with a frequency necessary to prevent scale production and duration enough agitate and flush the CP layer and scale seed prone areas with low velocities near the membrane surface. The amount of bypassed volume is in range of 10-20% of the total feed volume. Again, there is no injection pumps or pressure boosting required since the pressure loss in first and second stage is more than the pressure loss in the pipe supplying the third stage. The AGV3 is opened slowly in conjunction with opening of the concentrate recovery valve AGV7 and ramp-up of the feed pump to maintain same production in the system during the intermittent injection period. This embodiment of the invention results in disruption of the steady-state scale forming conditions in the third stage. During the intermittent injection period following changes occur to the system —a) the TDS of the stream inside third stage is reduced by 20-40% causing full disruption of scale forming steady state, —b) the velocity in the third stage is increased by 25-50% causing rapid mixing of dead zones where scales seeds have high probability of forming, —c) the overall recovery of system temporarily drops by 5-10%. One pays some cost in overall recovery to cause this disruption of scale forming conditions in third stage, however, the frequency of such disruption can be less than 10% of the overall operating duration resulting in reduction of only 0.5-1% on total recovery. However, the overall productivity is higher since the cleaning cycles are reduced or eliminated as the system is less prone to the fouling from scaling conditions and allows for significantly longer operating periods before CIP requirements.

In one embodiment of the invention, the static concentrate valve+a parallel valve for CIP by-pass, shown in FIG. 1 as HGV4+AV3 and shown in FIG. 2 as HGV12+AV11 are replaced with a single automated-globe-valve shown in FIGS. 3 and 4 as AGV7. As discussed earlier in paragraph 15.3, a static concentrate valve is the starting point for scale formation in the system, an automated-globe-valve that is periodically opened during intermittent flush of third stage (paragraph 29) and the closed back to normal condition during other times, is significantly less prone to scale formation and expected to continuously clean itself during each intermittent flush step. Beside removal of scale from the valve, this prevent scenarios where RO systems develop scale on concentrate recovery valve causing reduction of flow through concentrate recovery valve, as scale grows and concentrate recovery flow reduces further, the system enters into a range of accelerated scaling (beyond maximum recovery limit) in a repetitive manner, allowing for accelerated scaling over few hours, which ultimately results in shutdown and requirement for chemical cleaning. This invention provides for reduced scaling characteristics of the entire system including membranes and valves and simultaneously supporting the intermittent flush for CP disruption as well, while keep the overall production steady.

In one embodiment of the invention, a high-pressure injection pump is plumbed to inlet of the third stage, allowing for following provisions —a) real time continuous injection of either pH adjustment chemical or anti-scalant to manage scale precipitation limit, —b) intermittent injection of a chemical to remove scale-seeds that may have formed during the normal online operations or —c) injection of chemical to soak the third stage during a condition when third stage has been taken offline for recovery and maintenance while remaining system is online for production, specially as shown in FIG. 4. This embodiment of the invention allows for another dimension of continuous or periodic disruption of scale forming condition while keeping the production online as well as allows for partial maintenance of third stage in an offline mode.

All four embodiments of the inventions described in paragraph 27-31 enable long-term operation of RO system without requiring the need to take it completely offline for CIP by reducing the fouling potential in first stage and then by frequently and proactively disrupting the scaling phenomena across the entire system.

The CIP limitations discussed in paragraph 16 within context of FIG. 1 are addressed by a process layout shown in FIG. 2. With help of additional valves set in FIG. 2, all three stages can be cleaned in parallel or one at a time with an optimum flow-through rate of the chemistry. For example, a 30 GPM per 8" pressure vessel would be an optimized CIP flow-rate which eliminates high cross-flow velocities, thus reducing risk of damage from particle abrasions and allows for same rate of chemistry delivery (contact time) to membranes thus cleaning at similar rate for all three vessels, which translate to simplified instructions for the operators. A well-planned plumbing header would allow 3-2-1 ratio of feed split into three stages if all stages are cleaned simultaneously. Alternatively, one stage at a time can be cleaned with pumping flow-rate adjustment for each stage. The FIG. 2 layout also reflects current state of art and addresses the challenge discussed within context of FIG. 1, however, it significantly increases the cost of the equipment as well as the complexity of CIP operation, particularly if it's done manually with valves that are not automated.

In one embodiment of the invention, a pair of valves are added between first/second and second/third stages and shown in FIGS. 3 and 4 as AV5/HV5 and AV6/HV6. Within the embodiment of this invention, these two valves, when combined with valves AV2/HV2, AGV3, AV4/HV4, CV2 (check-valve) allow for simultaneous CIP of all stages. This novel process layout presented in FIG. 3 solves the issues referenced in FIG. 1 (staged-CIP) along with reduction of complexity and cost as referenced in FIG. 2 (13 valves versus 9 valves). As shown in FIG. 2, it requires a total of 13 active valves to achieve parallel CIP of a 3-stage system. However, with two inter-stage valves, and additional valves with functions disclosed in paragraph 27-31, only a total of 9-valves are required to achieve parallel CIP of the same 3-stage system. This results in reduced cost of the original equipment, improved cleanability of the multistage, longer membrane life, and increased uptime due to overall fewer cleaning cycles per year and shortened time for CIP of the NF/RO system. Please refer to FIG. 3 for flow-arrows for CIP process utilizing only 9 active valves.

In one embodiment of the invention, as exclusively discussed in context of FIG. 4, an option for an automated valve AV10, a 3-way valve 3WV1 and a check-valve CV3 is available to allow for operation of first two stages while third stage is taken offline for maintenance or going through an online intermittent maintenance disclosed in paragraph 31 which may result in marginal product water quality and require a diversion of permeate from third stage. As shown in FIG. 4 (marked red in to show the differences from FIG. 3), a partial or full isolation of the third stage is achieved while keeping production from the first and second stage going to the Permeate Supply. In case of a partial isolation, the permeate from third stage is sent to the Permeate Divert line and requires an automated 3-way valve addition to the system design of FIG. 3, while in case of a full isolation, in addition to partial isolation steps, the concentrate from the first and second stage is sent directly to AGV7 bypassing third stage completely through an automated valve AV10 and in conjunction with a check-valve CV3. Within this disclosure of the invention, since the stage 1 and stage 2 can operate without being taken down for maintenance or CIP and the third stage can be isolated from the operations for short maintenance durations, the system overall productivity is increased significantly due to continuous operation of first two stages.

In one embodiment of the invention, the CIP inlet with check valve CV2 as shown in FIGS. 3 and 4 may be plumbed prior to the high-pressure pump P2, in-between CV1 and P2, specifically in case of a centrifugal pump without creating noticeable pressure loss across it. In case of a positive displacement pump as P2, such approach may still be possible, however, it would require operation of the pump during CIP process to allow flow-through the pump.

In one embodiment of the invention, within the context of CP disruption benefits described in paragraph 31, the third stage of the system is periodically flushed with 10-20% additional feed volume by injecting 10-50% additional feed volume to the entire system in conjunction with relaxing of the proportional concentrate recovery valve, resulting in partial flushing of all three stages while all stages continue to produce, and supply permeate.

Although, the inventive methods above in paragraphs 27-35 are taught around a 3-stage RO system, similar functionality is achievable with a 2-stage system or a 4-stage system where last two stages are treated as a single stage of middle two stages are treated as one stage. With a disclosure for 3-stage implementation, as taught here, a person having ordinary skill in the art (PHOSITA) may be able to implement the concept and inventive steps in a 4-stage application in lower salinity levels or even in in a 2-stage application with higher salinity levels.

The invention claimed is:

1. A desalination process for treating water using a three-stage reverse osmosis system comprising:
   a first stage, a second stage, and a third stage; each stage having a feed inlet stream, a concentrate outlet stream, and a permeate outlet stream; wherein the number of pressure vessels decrease in subsequent stages;
   wherein the three stages are configured to have the permeate stream flow in- parallel, and the concentrate stream flow in-series through subsequent stages;
   a clean-in-place (CIP) system, wherein the CIP system receives combined permeate flow or combined concentrate flow or both from the three stages;
   wherein using a plurality of valves and parallel piping, a first component of the feed stream is configured to flow to the first stage inlet, a second component of the feed stream is configured to flow to the second stage inlet, and a third component of the feed stream is configured to flow to the third stage inlet;
   wherein the concentrate outlet stream of the first stage blends with the second component of the feed stream to make a blended feed inlet stream for the second stage and the concentrate outlet stream of the second stage blends with the third component of the feed stream to make a blended feed inlet stream for the third stage;
   wherein the second component of the feed stream is 15-30% of the feed stream and the third component of the feed stream is 10-20% of the feed stream;
   wherein, using a plurality of valves and parallel piping, the second stage and the third stage components of the feed inlet stream are controlled in both volume and duration, respectively, of the total feed stream;
   wherein, during the normal operation, the components of the feed stream to the second and the third stage is continuous or intermittent;
   and wherein the plurality of valves and parallel piping to the second and third stage used during the normal operation are also used for the offline CIP process.

2. The desalination process of claim 1 wherein the three-stage reverse osmosis system has a staging ratio of 3:2:1.

3. The desalination process of claim 1, wherein the third stage is taken offline intermittently and isolated for maintenance, while the rest of the stages are in the normal operation; wherein the period of isolation is 1-100 minutes and frequency of the isolation is once in 1-100 hours.

4. The desalination process of claim 1, wherein the third stage of the system is a series combination of two pressure vessels connected in series and represents a combined third and fourth stage of the system.

5. The process of claim 1, wherein, the process-flow is controlled via a programmable logic controller (PLC) and decisions to achieve novel process characteristics are programmed within PLC with adjustable periods, frequency, production rate, flowrate, % recovery, pressure, and flow conditions.

6. The process of claim 1, wherein the third stage, as part of maintenance, receives intermittent injection of chemicals to disrupt fouling and to dissolve scale-forming seeds; the period of intermittent chemical injection is between 0.5-60 minutes and intermittency is between 1-100 hours and occurs either during normal operations or at the start of isolation of the third stage for maintenance.

7. The process of claim 1, wherein, the third stage of the system is periodically flushed with 10-50% additional feed.

* * * * *